United States Patent
Giles, Jr.

(10) Patent No.: US 9,737,069 B1
(45) Date of Patent: Aug. 22, 2017

(54) RODENT TRAP WITH GLUE

(71) Applicant: Eddie L. Giles, Jr., Semmes, AL (US)

(72) Inventor: Eddie L. Giles, Jr., Semmes, AL (US)

(*) Notice: Subject to any disclaimer, the term of this patent is extended or adjusted under 35 U.S.C. 154(b) by 130 days.

(21) Appl. No.: 14/791,285

(22) Filed: Jul. 3, 2015

(51) Int. Cl.
*A01M 23/30* (2006.01)
*A01M 23/00* (2006.01)
*A01M 23/24* (2006.01)

(52) U.S. Cl.
CPC ........ *A01M 23/005* (2013.01); *A01M 23/245* (2013.01); *A01M 23/30* (2013.01); *A01M 2200/00* (2013.01)

(58) Field of Classification Search
CPC .. A01M 23/245; A01M 23/30; A01M 23/005; A01M 23/00
USPC ............... 43/58, 81–83, 94, 96, 124, 131
See application file for complete search history.

(56) References Cited

U.S. PATENT DOCUMENTS

| | | | |
|---|---|---|---|
| 1,004,448 A | 9/1911 | Mainland | |
| 2,311,178 A * | 2/1943 | Jorgensen | A01M 23/30 43/81.5 |
| 4,438,584 A * | 3/1984 | Baker | A01M 23/005 43/114 |
| 5,488,800 A | 2/1996 | O'Hara | |
| 7,117,631 B2 * | 10/2006 | Peters | A01M 31/008 43/81 |
| 7,162,832 B2 * | 1/2007 | Simpson | A01M 23/30 43/81 |
| 7,954,275 B2 | 6/2011 | Frisch | |
| 2004/0244273 A1 * | 12/2004 | Simpson | A01M 23/30 43/81 |
| 2010/0115824 A1 | 5/2010 | Frisch | |
| 2010/0154288 A1 | 6/2010 | Frisch | |
| 2012/0042562 A1 * | 2/2012 | Liao | A01M 23/005 43/58 |
| 2013/0036658 A1 | 2/2013 | Bayne | |
| 2016/0278363 A1 * | 9/2016 | Hsu | A01M 31/002 |

* cited by examiner

*Primary Examiner* — Darren W Ark
*Assistant Examiner* — Danielle Clerkley
(74) *Attorney, Agent, or Firm* — George L Williamson

(57) ABSTRACT

An improved rodent trap having a base, hammer bar, hold down bar, spring for the hammer bar, a latch member for the hold down bar and a bait member for holding the bait thereon just as a conventional rodent trap, and, also containing a glue area on either end of the trap wherein the platform has a cut-out area or receptacle area therein so that glue can be placed throughout the area of the base so that if a rodent comes near the trap he will either be killed by the hammer bar in a conventional manner or caught in the glue area. An optional string, which may contain disinfectant, may also be attached to the platform and used to pick-up the trap.

14 Claims, 2 Drawing Sheets

RODENT TRAP WITH GLUE

BACKGROUND OF THE INVENTION

Field of the Invention

The present invention relates generally to pest control accessories, and, more particularly, is concerned with an improved rodent, e.g., rat or mouse, trap that, in addition to its conventional components, has glue disposed in its platform.

Description of the Related Art

Devices relevant to the present invention have been described in the related art, however, none of the related art devices disclose the unique features of the present invention.

In U.S. Pat. No. 5,488,800 dated Feb. 6, 1996, O'Hara disclosed a spring operated animal trap with sticky trigger. In U.S. Pat. No. 7,954,275 date Jun. 7, 2011, Frisch disclosed a rodent trap with removable trigger plate. In U.S. Patent Application Publication 2010/0115824 dated May 13, 2010, Frisch disclosed a rodent snap action trap. In U. S. Patent Application Publication 2010/0154288 dated Jun. 24, 2010, Frisch disclosed an animal trap with replaceable trigger. In U.S. Patent Application Publication 2013/0036658 dated Feb. 14, 2013, Bayne disclosed a rodent snap trap. In U.S. Pat. No. 1,004,448 dated Sep. 26, 1911, Mainland disclosed an animal trap having a tether for anchorage.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses an improved conventional rat or mouse trap having a platform, hammer bar, hold down bar, spring for the hammer bar, a latch member for the hold down bar and a bait member for holding the bait thereon just as does a conventional mouse trap. However, the present invention also contains a glue area on either end of the mouse trap wherein the platform has a cut-out area or receptacle area therein so that glue can be placed throughout the area so that if a rodent comes near the trap he will either be killed by the hammer bar in a conventional manner or caught in the glue area. An additional area containing glue is also placed on the bait member where the bait is placed so that the extra glue on the bait member will make it more difficult for the rodent to move the bait without setting off the trap. Additionally, a string, which may contain disinfectant, is attached to the platform so that a user does not have to touch the present invention in order to pick-up and move the present invention which may have a rodent attached thereto.

An object of the present invention is to provide glue on the platform to catch the rodent by ensnaring the rodent even if the hammer bar doesn't snap or the hammer bar snaps and misses the rodent. A further object of the present invention is to provide glue on the trap to reduce the incidence of bait being stolen from the trap by a rodent. A further object of the present invention is to provide an improved mouse trap having glue disposed in a receptacle in the platform wherein the glue can assist in the trapping of a rodent. A further object of the present invention is to place glue on the bait holding member of the present invention so that if the rodent touches the glue it will set off the trap. A further object of the present invention is to provide a pick-up string attached to the platform of the present invention for disposal purposes so that a user does not have to touch the platform with his hands. A further object of the present invention is to provide an improved mouse trap which can be easily operated by a user. Further object of the present invention is to provide an improved mouse trap which can be relatively inexpensively and easily manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
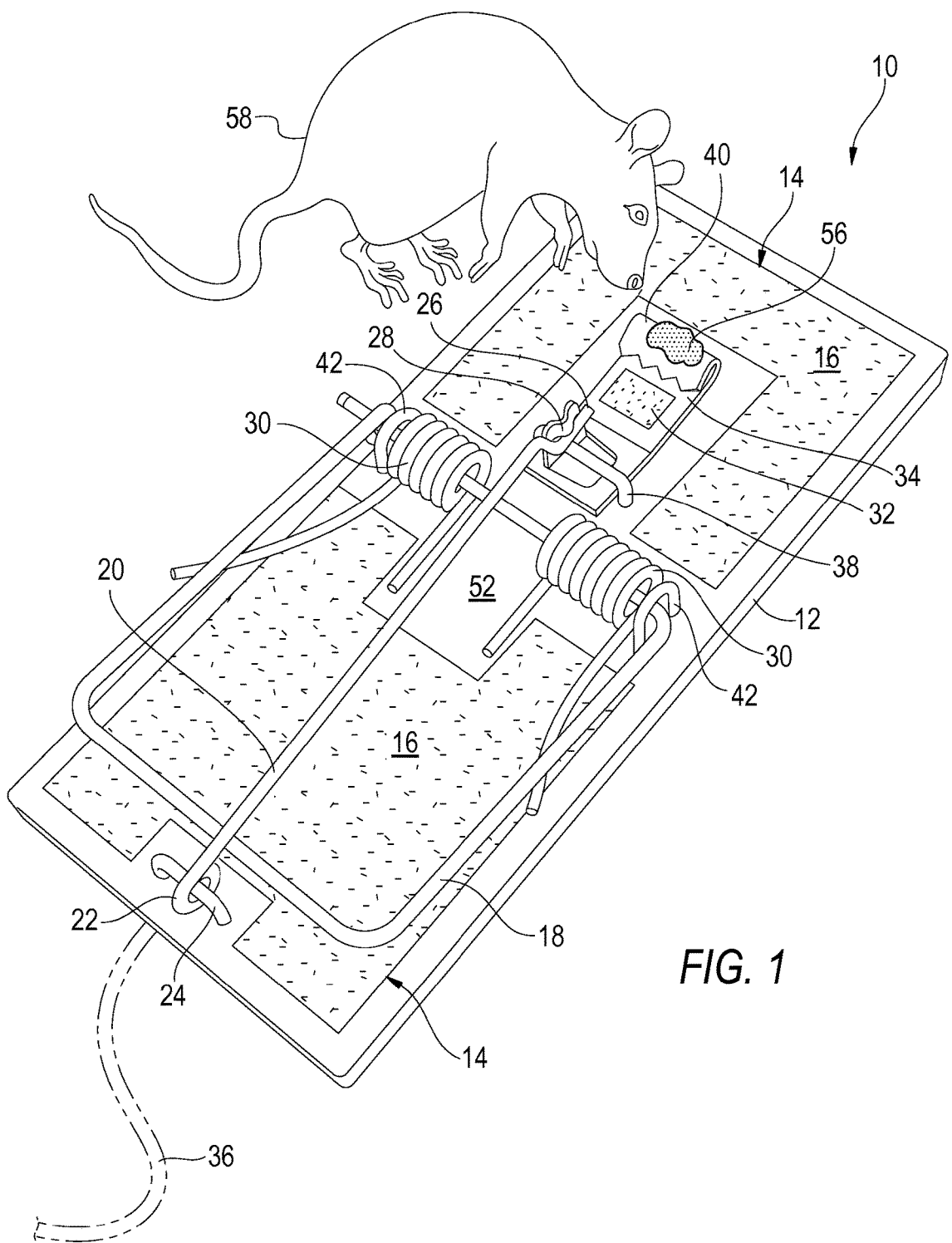
FIG. 1 is a perspective view of the present invention.

With regard to reference numerals used, the following numbering is used throughout the drawings.

10 present invention
12 base/platform
14 cut-out area
16 glue area
18 hammer bar
20 hold down bar
22 base of hold down bar
24 staple for base of hold down bar
26 tip of hold down bar
28 latch member
30 spring
32 glue area
34 bait holder
36 pick-up string
38 staple for bait holder
40 curled end
42 staple for hammer bar
44 first end
46 second end
48 first side
50 second side
52 rib
54 wall
56 bait
58 rodent

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 4 illustrate the present invention wherein an improved mouse or rat trap with glue is disclosed and which is generally indicated by reference number 10.

Figure 2:
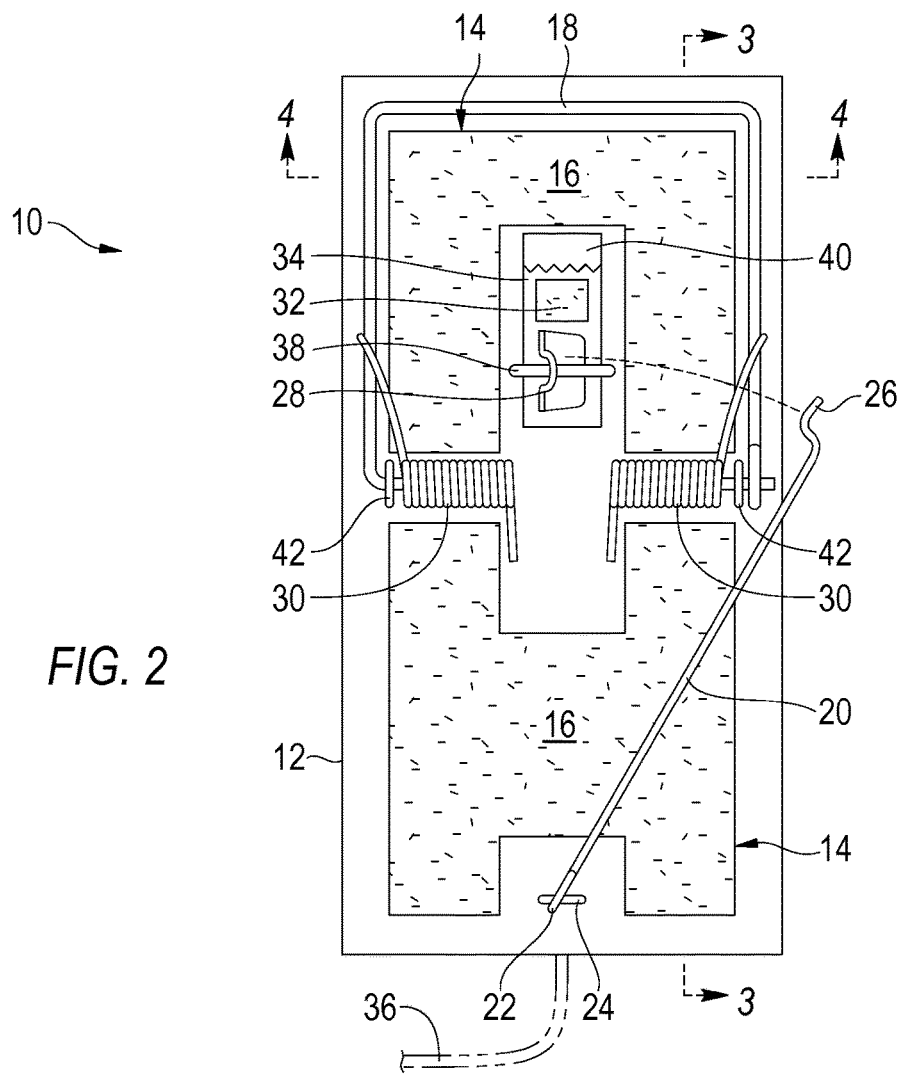
FIG. 2 is a plan view of the present invention.

Turning to FIGS. 1 and 2, therein is shown the present invention 10 which is an improved mouse/rat trap having a platform or base 12 wherein the platform contains a cut-out area or receptacle 14 containing glue 16 placed therein so that the glue is generally spread between first and second ends of the platform and the first and second sides of the platform. Also shown is the hammer or kill bar 18 which is held in the cocked position by a hold down bar 20 having a base 22 which rotates around an anchoring member or staple 24 wherein the hold down bar 20 has a second end having a bent end configured to form a catch 26 thereon which catch can be loosely connected to the latch member 28 and secured so that the hammer bar 18 is held in place and tensioned by a pair of springs 30 which spring biases the hammer bar from the cocked position (as shown in FIG. 1) toward the uncocked position (as shown in FIG. 2). Also shown is a glue area 32 placed on a metal pedal or bait holder member 34 so as to provide an additional area containing glue which will assist in trapping or ensnaring the rodent if the hammer bar 18 misses the rodent or does not go off. Bait holder 34 is held in place by being loosely mounted onto another staple 38. Also shown is a pick up string 36 disposed on an end of the base/platform 12 for disposal so that a user can pick up the present invention 10 without having to touch it. Also, it is possible that the base 12 and/or pick-up string 36 may be treated to contain disinfectant which will additionally prevent germs from being spread to a user as he picks up the present invention 10 using the string 32. Bait holder member 34 may have a curled distal end 40 (See FIG. 1) thereon upon which bait such as cheese can be placed. Additional staples 42 attach the hammer bar 18 to the platform 12. In FIG. 2, a paw of rodent 58 is about to contact glue 16 as it steps toward the bait 56, e.g., cheese, peanut butter, because the glue area 16 nearly surrounds the bait 56 because the t-shaped rib extends towards each end 44, 46 from its mid-section.

Figure 3:
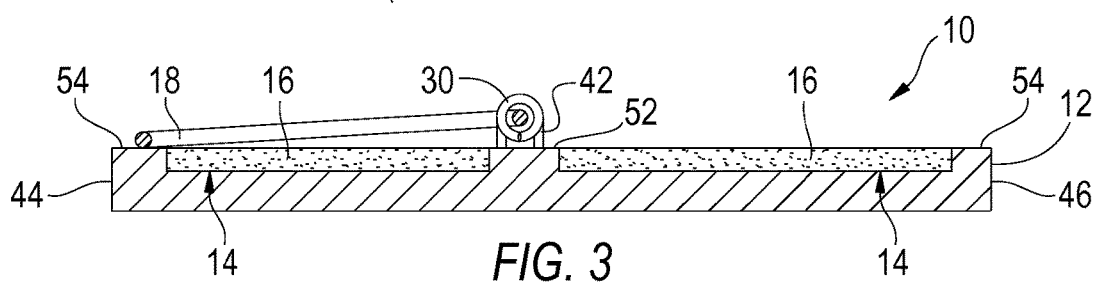
FIG. 3 is a cross sectional view of the present invention taken from FIG. 2 as indicated.
Figure 4:
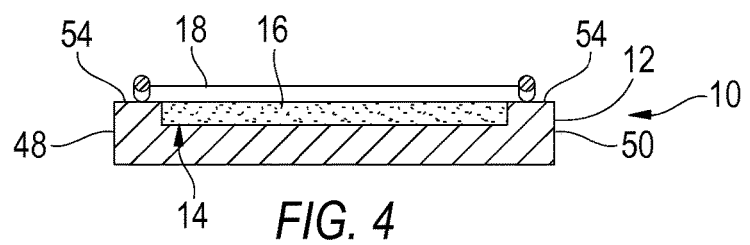
FIG. 4 is a cross sectional view of present invention taken from FIG. 2 as indicated.

Turning to FIGS. 3 and 4, therein is shown the present invention 10 having a platform 12 wherein the platform contains a cut-out area or receptacle 14 having glue 16 placed therein so that the glue is spread between first and second ends 44, 46 of the platform and the first and second sides 48, 50 of the platform leaving a t-shaped structural reinforcement rib 52 extending between first to second sides 48, 50 of the platform. Rib 52 is approximately intermediately disposed relative to the first and second ends 44, 46. Rib 52 also forms a foundation upon which staples 38 and 42 can be disposed. It is expected that the thickness of the cut-out area 14 will be about one-fourth to three-fourths the thickness of the platform 12. There is a first glue area 16 between rib 52 and first end 44 and a second glue area 16 between the rib 52 and second end 46. Also, a relatively thin upright standing wall 54 formed by the cut-out area 14 surrounds the glue area 16 on three sides while rib 52 forms the fourth side of the glue area as the wall runs around the periphery of the platform 12. Other previously disclosed items may also be shown.

While the platform 12 and related components of the present invention 10 are illustrated by using a specific type of rat/mouse trap, it would be clear to one skilled in the art that a glue area 16 could be added to many other types or designs of rat/mouse traps.

Platform 12 may be constructed of any appropriate material as would be done in the standard manner by one skilled in the art, e.g., wood or plastic. The glue used in the present invention 10 may be made of any appropriate non-drying material as would be done in the standard manner by one skilled in the art, e.g., adhesive material.

The present invention 10 may be summarized as follows by making reference to FIGS. 1-4: A method of trapping a rodent 58, comprising the steps of: a) providing a base 12 having first and second ends 44, 46 and first and second sides 48, 50; b) disposing a hammer bar 18 on the base, wherein the hammer bar is pivotally attached to the base, the hammer bar being movable between an uncocked position and a cocked position; c) attaching a spring 30 to the hammer bar so that the spring biases the hammer bar to move from the cocked position toward the uncocked position; d) providing a bait holding member 34 configured for pivotal attachment to the base and disposing a latch 28 on the bait holding member, the bait holding member configured at 40 for attachment of rodent bait 56 thereto; e) providing a hold down bar 20 having first and second ends 22, 26, the first end being pivotally attached to the base, the second end configured for removable securement to the latch; f) wherein the hold down bar is adapted to cooperate with the hammer bar and the latch so that when the hammer bar is in the cocked position the second end of the hold down bar is removably secured to the latch so that the hammer bar is secured in the cocked position, wherein when the rodent moves the bait on the bait holding member the second end of the hold down bar is released from the latch thereby releasing the hammer bar to move from the cocked position to the uncocked position so as to strike the rodent; g) providing first and second cut-our areas 16 disposed in the base, a rib 52 disposed between the first and second cut-out areas, wherein the rib extends across the base from the first side to the second side, wherein the rib is disposed between the first and second ends of the base; and, h) disposing an adhesive material in the first and second cut-out areas so that the rodent can become ensnared in the adhesive material upon contact therewith.

I claim:

1. A rodent trap, comprising:
   a) a base having first and second ends and first and second sides;
   b) a hammer bar disposed on said base, wherein said hammer bar is pivotally attached to said base, said hammer bar being movable between an uncocked position and a cocked position;
   c) a spring attached to said hammer bar and configured to bias said hammer bar from said cocked position toward said uncocked position;
   d) a bait holding member configured for pivotal attachment to said base, a latch disposed on said bait holding member, said bait holding member configured for attachment of a rodent bait thereto;
   e) a hold down bar having first and second ends, said first end being pivotally attached to said base, said second end configured for removable securement to said latch;

f) wherein said hold down bar is adapted to cooperate with said hammer bar and said latch so that when said hammer bar is in said cocked position said second end of said hold down bar is removably secured to said latch to secure said hammer bar in said cocked position, wherein when the rodent moves the bait on said bait holding member said second and of said hold down bar is released from said latch thereby releasing said hammer bar to move from said cocked position to said uncocked position so as to strike the rodent;

g) first and second cut-out areas disposed in said base, a rib disposed between said first and second cut-out areas, wherein said rib extends across said base from said first side to said second side, wherein said rib is disposed between said first and second ends of said base, said rib supporting said spring and said bait holding member with said latch; and, h) an adhesive material disposed in said first and second cut-out areas so that the rodent can become ensnared in said adhesive material upon contact therewith.

2. The rodent trap of claim 1, further comprising a string being directly attached to said base for disposal of the rodent trap.

3. The rodent trap of claim 2, wherein said string is treated with a disinfectant.

4. The rodent trap of claim 3, further comprising adhesive material disposed on said bait holding member so that the rodent can become ensnared in said adhesive material disposed on said bait holding member upon contact therewith.

5. A method of trapping a rodent, comprising the steps of:

a) providing a base having first and second ends and first and second sides;

b) disposing a hammer bar on the base so that the hammer bar is pivotally attached to the base and movable between an uncocked position and a cocked position;

c) attaching a spring to the hammer bar so that the spring biases the hammer bar to move from the cocked position toward the uncocked position;

d) providing a bait holding member configured for pivotal attachment to the base and disposing a latch on the bait holding member, the bait holding member configured for attachment of a rodent bait thereto;

e) providing a hold down bar having first and second ends, the first and being pivotally attached to the base, the second and configured for removable securement to the latch;

f) wherein the hold down bar is adapted to cooperate with the hammer bar and the latch so that when the hammer bar is in the cocked position the second end of the hold down bar is removably secured to the latch so that the hammer bar is secured in the cocked position, wherein when the rodent moves the bait on the bait holding member the second end of the hold down bar is released from the latch thereby releasing the hammer bar to move from the cocked position to the uncocked position so as to strike the rodent;

g) providing first and second cut-out areas disposed in the base, a rib disposed between the first and second cut-out areas, wherein the rib extends across the base from the first side to the second side, wherein the rib is disposed between the first and second ends of the base, said rib supporting said spring and said bait holding member with said latch; and, h) disposing an adhesive material in the first and second cut-out areas so that the rodent can become ensnared in the adhesive material upon contact therewith.

6. The method of claim 5, further comprising the step of providing a string being directly attached to the base for disposal of the rodent trap.

7. The method of claim 6, further comprising the step of treating the string with disinfectant.

8. The method of claim 7, further comprising the step of providing adhesive material disposed on the bait holding member so that the rodent can become ensnared in the adhesive material disposed on the bait holding member upon contact therewith.

9. The method of claim 8, further comprising the step of treating the base with disinfectant.

10. A rodent trap having a base, a hammer bar disposed on the base, a bait holding member for receiving bait thereon disposed on the base, the hammer bar adapted to snap closed upon a rodent in response to motion of the bait holding member caused by the rodent removing bait from the bait holding member, comprising a) said base having first and second ends and first and second sides;

b) first and second cut-out areas disposed in said base, wherein said cut-out areas extend across said base from said first side to said second side, wherein a rib separates said cut-out areas and supports said bait holding member; and, c) an adhesive material disposed in said cut-out areas so that the rodent can become ensnared in said adhesive material upon contact therewith.

11. The rodent trap of claim 10, having a pickup string connected directly to said base, said string containing a disinfectant.

12. The rodent trap of claim 11, wherein the base comprises a disinfectant.

13. The rodent tap of claim 10, further comprising adhesive material disposed on the bait holding member so that the rodent can become ensnared in said adhesive material disposed on said bait holding member upon contact therewith.

14. The rodent trap of claim 13, wherein said rib extends across said base from said first side to said second side, wherein said rib is disposed between said first and second ends of said base; and, an adhesive material disposed in said first and second cut-out areas so that the rodent can become ensnared in said adhesive material upon contact therewith.

* * * * *